United States Patent
Ha et al.

(10) Patent No.: US 8,115,606 B2
(45) Date of Patent: Feb. 14, 2012

(54) MATCHING A TRANSMITTER AND A RECEIVER SUPPLIED BY THE SAME POWER MODULE

(75) Inventors: Wai-leung Ha, Mid Levels (CN); Kairy Kei Lei, Shang Mei Lin (CN); David B. Stevens, New Territories (CN)

(73) Assignee: Computime, Ltd., Hong Kong (HK)

( * ) Notice: Subject to any disclaimer, the term of this patent is extended or adjusted under 35 U.S.C. 154(b) by 1325 days.

(21) Appl. No.: 11/252,905

(22) Filed: Oct. 18, 2005

(65) Prior Publication Data
US 2007/0085696 A1 Apr. 19, 2007

(51) Int. Cl.
*G05B 11/01* (2006.01)
(52) U.S. Cl. ...................................... 340/12.35; 340/3.5
(58) Field of Classification Search ............ 340/825.22, 340/10.1, 825.69, 825.72, 538.13, 538.15, 340/5.22, 3.5
See application file for complete search history.

(56) References Cited

U.S. PATENT DOCUMENTS

| | | | |
|---|---|---|---|
| 4,442,514 A | 4/1984 | Roth | |
| 4,560,832 A | 12/1985 | Bond et al. | |
| 4,593,273 A * | 6/1986 | Narcisse | 340/573.4 |
| 4,639,549 A | 1/1987 | Hirayama et al. | |
| 4,639,550 A | 1/1987 | Yamagawa et al. | |
| 4,700,375 A | 10/1987 | Reed | |
| 4,736,404 A | 4/1988 | Anglikowski et al. | |
| 4,794,636 A | 12/1988 | Sanglier et al. | |
| 5,097,500 A | 3/1992 | Itoh | |
| 5,148,159 A * | 9/1992 | Clark et al. | 340/825.22 |
| 5,392,454 A | 2/1995 | Kowal et al. | |
| 6,212,396 B1 | 4/2001 | Brown et al. | |
| 6,748,228 B1 | 6/2004 | Izaki et al. | |
| 6,920,337 B2 | 7/2005 | Pinsky et al. | |

FOREIGN PATENT DOCUMENTS

| | | |
|---|---|---|
| EP | 0037763 A1 | 3/1981 |
| JP | 54004010 | 1/1979 |

* cited by examiner

*Primary Examiner* — Vernal Brown
(74) *Attorney, Agent, or Firm* — Banner & Witcoff, Ltd.

(57) ABSTRACT

A transmitter and a receiver are paired that use the same power line and power module. The transmitter associates an identification number with a command message so that a receiver can ascertain that a command message is intended for the receiver. The transmitter uses the time from the power up to the first zero crossing of the AC signal to generate a matching seed for both transmitter and receiver. The transmitter generates an identification number by incrementing a counter each incremental time interval between power up and the occurrence of the first zero crossing of the AC signal and sends the generated identification number to the paired receiver after power up but before a predetermined time interval. The receiver stores the generated identification number and compares the stored identification number with a received identification number that is received in a subsequent command message.

20 Claims, 5 Drawing Sheets

MATCHING A TRANSMITTER AND A RECEIVER SUPPLIED BY THE SAME POWER MODULE

FIELD OF THE INVENTION

The present invention relates generally to the field of controlling a receiver by a transmitter over a wireless communications channel, and more particularly to generating an identification for matching the transmitter with the receiver.

BACKGROUND OF THE INVENTION

When many RF devices utilize the same frequency spectrum in close proximity to each other, a receiver may be controlled by the wrong transmitter. The traditional method to avoid the mismatching is to use dipswitch settings at both transmitter and receiver for pairing the transmitter and the receiver. The user typically configures the dipswitch settings of the transmitter to match the dipswitch settings of the paired receiver. However, the approach is not flexible and is demanding on the user. Often, the user will select only the default setting and therefore incorrectly configure the system so that transmitters are incorrectly paired with receivers.

Consequently, there is a need to support transmitter-receiver pairing that is reliable and that facilitates system configuration by the user.

SUMMARY OF THE INVENTION

The present invention provides methods and apparatuses that support a flexible approach to pairing a transmitter and a receiver that use the same power line and power module while facilitating system configuration. The transmitter associates an identification number with a command message so that a receiver can ascertain whether a command message is intended for the receiver. The transmitter communicates with the receiver over a wireless communications channel.

With one aspect of the invention, the time from the power up of the transmitter-receiver pair to the first zero crossing of the AC signal that powers an associated AC-DC converter is approximately random. An associated identification number is used as a matching seed for both transmitter and receiver.

With another aspect of the invention, the transmitter generates an identification number by incrementing a counter each counting time interval between power up and the occurrence of a first zero crossing of the AC signal. The occurrence of the zero crossing is detected by a zero crossing detector.

With another aspect of the invention, the transmitter sends the generated identification number to the paired receiver after power up but before a predetermined time interval. The receiver stores the generated identification number and compares the stored identification number with a received identification number that is received in a subsequent command message. If the stored identification number matches the received identification number, the receiver processes the command message and executes the associated action. Otherwise, the receiver ignores the received command message.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION OF PREFERRED EMBODIMENTS

Figure 1:
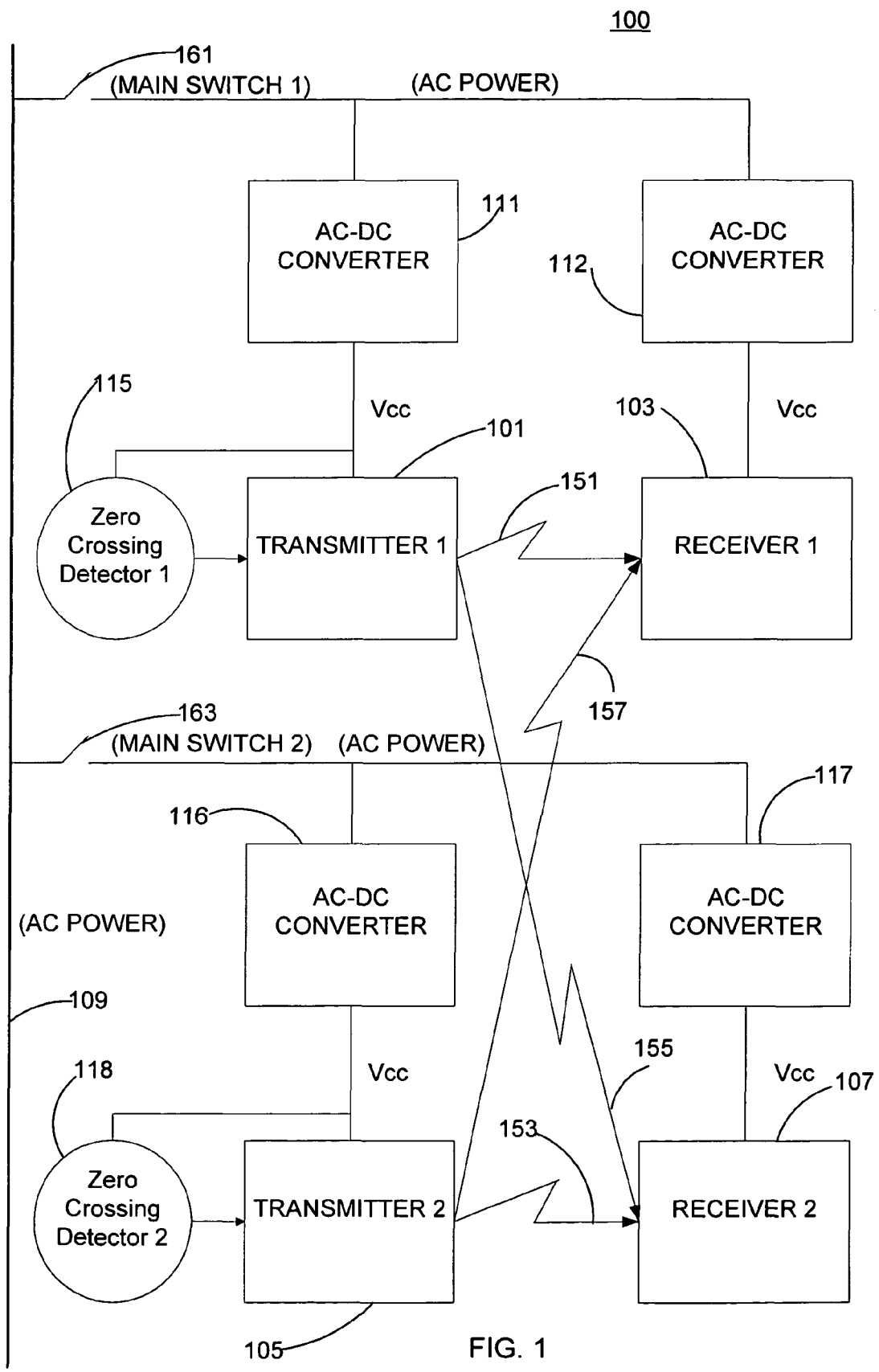
FIG. 1 shows a transmitter-receiver configuration in accordance with an embodiment of the invention.

FIG. 1 shows transmitter-receiver configuration 100 in accordance with an embodiment of the invention. Configuration includes two transmitter-receiver pairs in which each pair is provided electrical power by the same ON/OFF Main Switches 161 and 163. The first pair comprises transmitter 101 and receiver 103, which are powered by ON/OFF Main Switch1 161. The second pair comprises transmitter 105 and receiver 107, which are powered by ON/OFF Main Switch2 163. The embodiment may support more than two transmitters-receiver pairs.

Each transmitter of the pair communicates with the corresponding receiver over a wireless communication channel in order to instruct the receiver to take an appropriate action (e.g., activating a heating system). In the configuration 100, transmitter 101 communicates with receiver 103 over wireless channel 151, and transmitter 105 communicates with receiver 107 over wireless channel 153. However, transmitter-receiver pairs may be located in close proximity to each other so that the receiver of one pair may undesirably receive a command signal from the transmitter of the other pair if the pairs utilize the same electromagnetic spectrum. In configuration 100, receiver 107 may undesirably receive a command signal from transmitter 101 over spurious wireless channel 155, and receiver 103 may undesirably receive a command signal from transmitter 105 over spurious wireless channel 157.

Each transmitter-receiver pair is associated with a corresponding identification number to distinguish one pair from another. For example, a first identification number (e.g., '099') may be associated with the first pair (transmitter 101 and receiver 103), and a second identification number (e.g., "117') may be associated with the second pair (transmitter 105 and receiver 107). When transmitter 101 sends a command message to receiver 103, transmitter 101 includes the first identification number in the command message. Receiver 103 stores the associated identification number and accepts the command message only if received identification number matches the stored identification number. Otherwise, receiver 103 ignores a received command message. Consequently, undesired communication over spurious wireless channels 155 and 157 are avoided.

In an embodiment of the invention, an identification number (which approximates a random number) is determined by calculating the time interval between power up and first zero crossing detected by the transmitter of an AC signal that provides electrical power to the transmitter-receiver pair. In configuration 100, as shown in FIG. 1, zero crossing detector 115 detects zero crossings of the AC signal provided by AC line 109. The time between the power up to first zero crossing is approximately random. A random number is generated and FIG. 2 based on this random time. The random number is stored in the transmitter and also transmitted to receiver and stored in receiver until the transmitter-receiver pair is powered down. The determined identification number is transmitted to a receiver (e.g., receiver 103) that is paired with a transmitter (e.g., transmitter 101). The identification number is sent to the receiver by the transmitter in a predetermined time duration (e.g., 5 seconds) after the transmitter-receiver pair powers up. For transmitter-receiver pair 1 (comprising transmitter 101 and receiver 103), the identification number may be sent by transmitter 101 more than once to ensure receiver 103 receives the identification number. Receiver 103 stores the received identification number until receiver 103 powers down. Receiver 103 waits to receive the identification number in the predetermined time duration. If receiver 103 does not receive the identification number in the predetermined time duration, receiver 103 generates a warning signal (e.g., by blinking an LED) to user. In all subsequent communications, transmitter 101 sends the command data together with the identification number (seed) to receiver 103. The identification number may be sent before or after the sending the data or within a message containing the data. When receiver 103 receives a message, receiver 103 decodes the received identification number to ascertain that transmitter 101 sent the message (rather than transmitter 105). If the received identification number does not match the stored identification number, the message (with the associated command) is ignored (discarded). If the received identification number matches the stored identification number, receiver 103 processes the received massage and executes an action based on the received message. For transmitter-receiver Pair 2 (comprising transmitter 105 and receiver 107), the same process will apply and a different random number will be generated as the identifier of transmitter-receiver Pair 2, 105 and 107.

Figure 2:
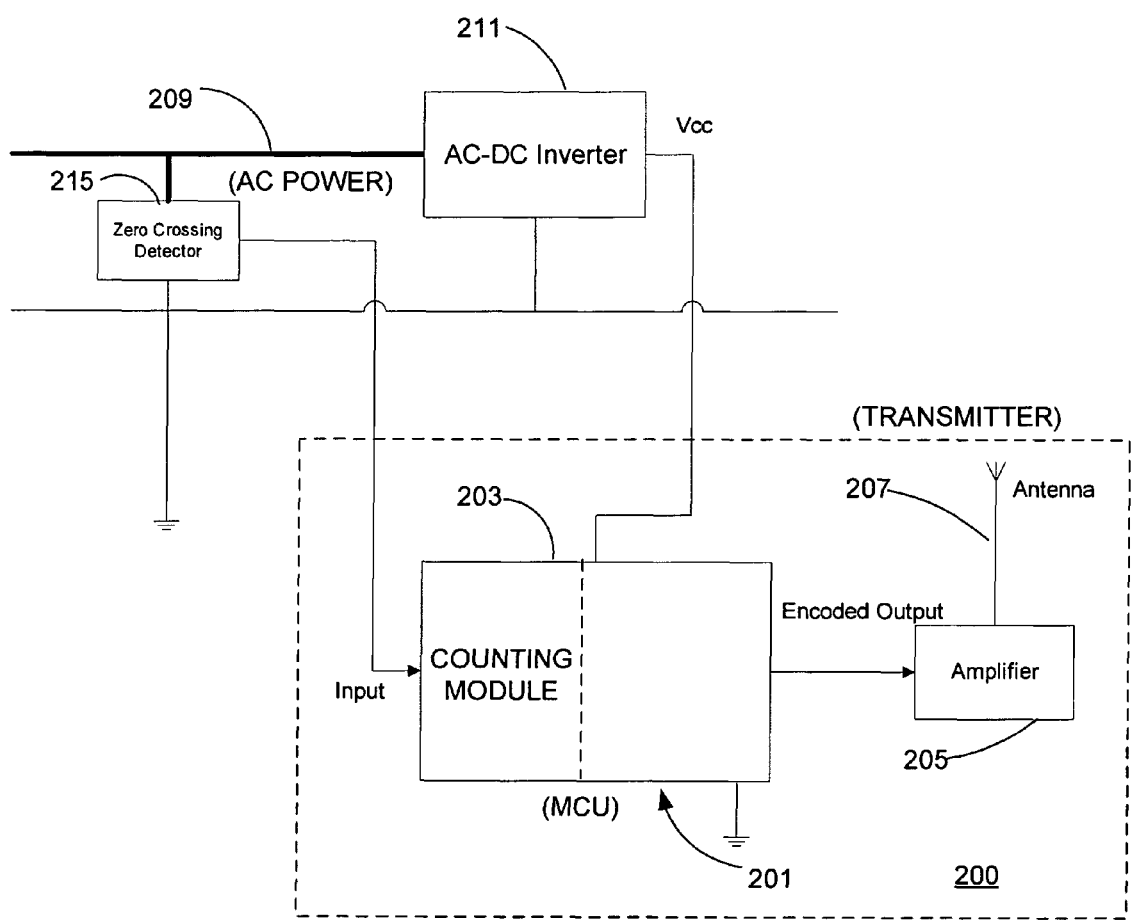
FIG. 2 shows a basic configuration for a transmitter in accordance with an embodiment of the invention.

FIG. 2 shows an architecture for a transmitter 200 of a transmitter-receiver pair in accordance with an embodiment of the invention. The transmitter 200 includes microprocessor unit (MCU) 201, RF amplifier 205, and antenna 207. In an embodiment of the invention, MCU 201 incorporates counting module 203, which generates an identification number based on an input (e.g., the generation of an interrupt) from zero crossing detector 215. (However, other embodiments utilize a separated counting module that generates a second input to a microprocessor unit that corresponds to an internal interrupt.) Transmitter 200 is provided electrical power by the same AC-DC converter (power module) 211 as the associated receiver (not shown).

Microprocessor unit 201, as shown with the embodiment of FIG. 2, has internal counter ability as supported by counting module 203. Counting module 203 has an adjustable incremental timing value between 0.01 msec to 0.1 msec, although the embodiment supports other incremental timing values. The generated identification number has a range from 0 to 1/(2*Line_Frequency*Counter_Interval). AC power line 209 is supplied an AC signal with 60 Hz in the United States and with 50 Hz in Europe. The maximum time for the occurrence of the first zero crossing is approximately 8.3 msec with a power frequency of 60 Hz and 10 msec with a power frequency of 50 Hz. With a AC signal having a frequency of 60 Hz and if MCU 201 increments a counter (as supported by counting module 203) every 0.064 msec (64 μsec), the generated identification number has a range of 0 to 1/(2*60*0.064)=128. However, other embodiments of invention support other incremental timing values.

Counting module 203 may count of a time duration that spans more than one zero crossing so that the range of the generated identification number may be increased. If counting module increments a counter over the first two zero crossings, the counter has a range of 1/(2*Line_Frequency*Counter_Interval). (For example, zero crossing detector 215 does not distinguish between the positive and negative portions of a cycle.) In the previous example, the corresponding range of the generated identification number is 0 to 256, which spans one octet of memory. The above approach may be generalized to span N zero crossings so that the range of the generated identification number is expanded by a factor of N. In an embodiment of the invention, MCU 201 may utilize a value associated with the first zero crossing to determine the number of subsequent zero crossings during which counting module 203 counts to generate an identification number.

While zero crossing detector 215 determines when the AC signal crosses a voltage value of zero, other embodiments of the invention may utilize detectors that detect when the AC signal provided by AC power line 209 crosses a reference other than zero (e.g., +50 volts).

The embodiment of the invention, as shown in FIGS. 1 and 2, supports a wireless communication channel that utilize an electromagnetic spectrum that includes a radio frequency (RF) spectrum, an infra-red spectrum, and a visible light spectrum. Amplifier 205 and antenna 207 are configured for the desired frequency spectrum so that transmitter 101 can communicate with receiver 103 over wireless channel 151.

Figure 3:
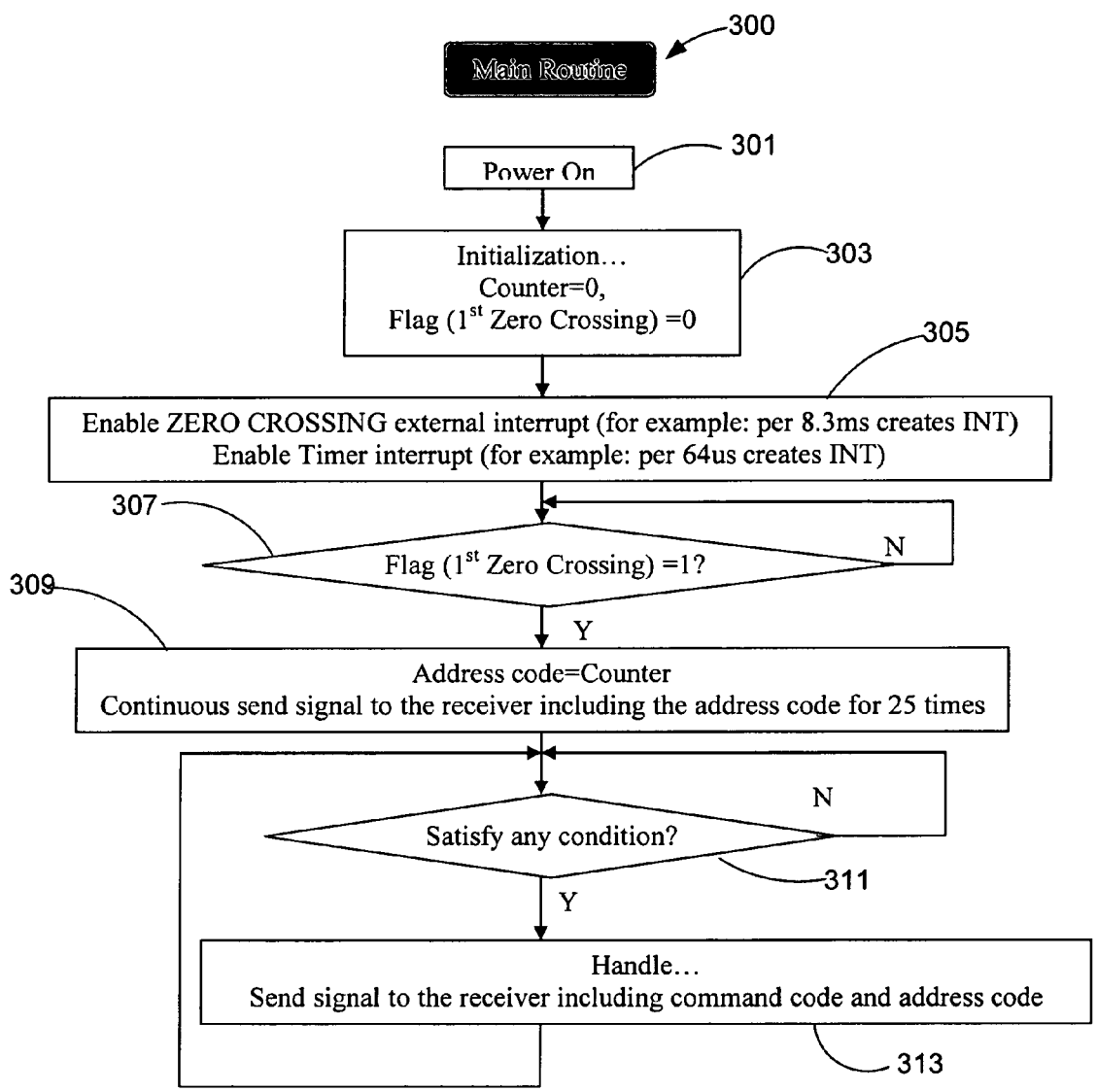
FIG. 3 shows a flow diagram that is executed by the transmitter configuration shown in FIG. 2 in accordance with an embodiment of the invention.

FIG. 3 shows flow diagram 300 that is executed by transmitter 200, as shown in FIG. 2, in accordance with an embodiment of the invention. In step 301, a transmitter-receiver pair (e.g., transmitter 101 and receiver 103) is powered on. Once the microprocessor unit (e.g., MCU 201) is powered on, counting module 203 and zero crossing detector 215 are initialized to zero in step 303. In step 305, microprocessor unit 201 enables interrupts for zero crossing detection (corresponding to an external interrupt in FIG. 2) and for counting (corresponding to an internal interrupt in FIG. 2).

In step 307, the counter is incremented by one time unit whenever an timer interrupt occurs. (The incrementing of counting module 203 is performed by Timer INT Subroutine 450 as will be discussed.) Each time unit corresponds to a timing incremental value (e.g., 64 μsec.) If the zero crossing flag is '0', as initialized in step 303, counting module 203 is subsequently incremented with subsequent timer interrupts. However, if the zero crossing flag is '1' (which corresponds to an zero crossing external interrupt and the execution of Zero Crossing INT Subroutine 400 as will be discussed), the generated identification number (equal to the counter value of counting module 203) is sent by transmitter 200 in step 309 to the paired receiver multiple times to insure that the paired receiver receives the generated identification number.

Step 311 determines whether a condition or a set of conditions, which corresponds to a particular action to be taken at the paired receiver, is satisfied. If so, transmitter 200 sends a command message to the paired receiver with the associated command code and the generated identification number in step 313.

Figure 4:
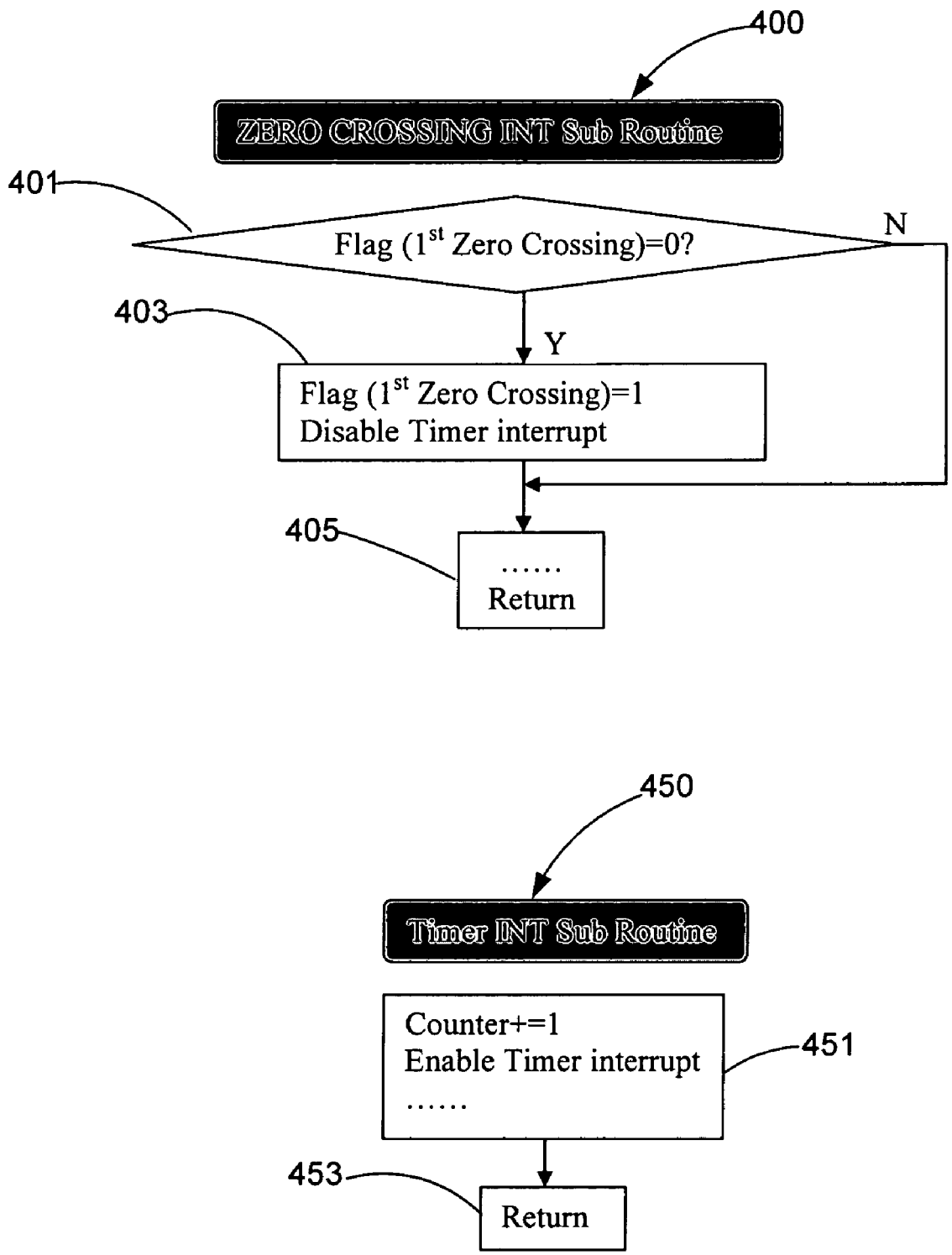
FIG. 4 shows flow diagrams for subroutines utilized by the flow diagram shown in FIG. 3 in accordance with an embodiment of the invention.

FIG. 4 shows flow diagrams for subroutines 400 and 450 utilized by the flow diagram 300 as shown in FIG. 3 in accordance with an embodiment of the invention. With Zero Crossing INT Subroutine 400 (which is executed when an external interrupt from zero crossing detector 215 occurs), step 401 determines if the zero crossing flag is '0'. If so, the zero crossing flag is set to '1 and the timer interrupt is disabled in step 403. If the zero crossing flag was previously set to '1' when the zero crossing interrupt occurs, the timer interrupt remains disabled. Subroutine 400 returns to Main Routine 300 in step 405. With Timer INT Subroutine 450, which executed only if the timer interrupt is enabled, the counter is incremented in step 451 whenever a timer interrupt occurs (which is every incremental timing interval). Subroutine 450 returns to Main Routine 300 in step 453.

Figure 5:
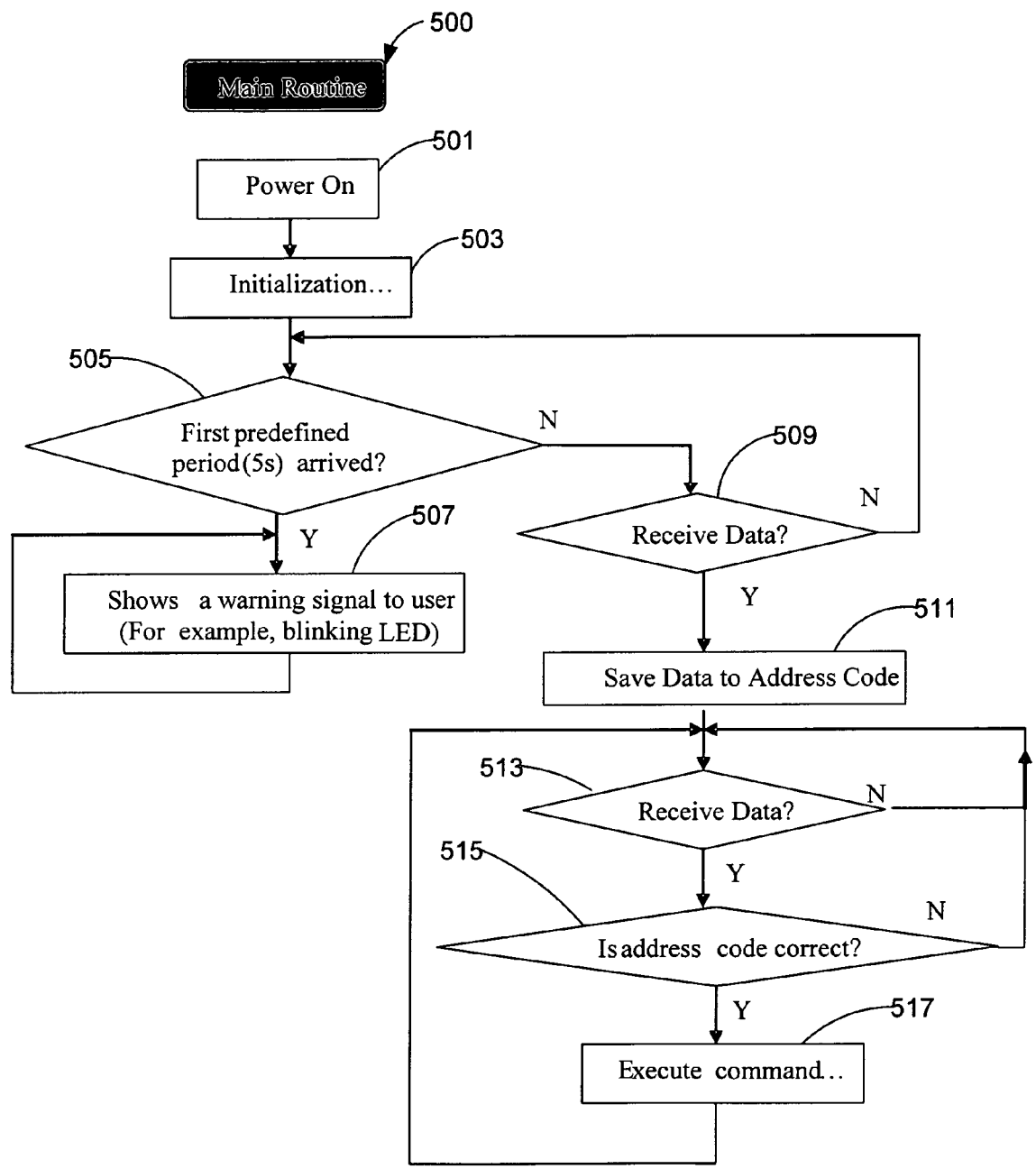
FIG. 5 shows a flow diagram of a receiver in accordance with an embodiment of the invention.

FIG. 5 shows flow diagram 500 of a receiver (e.g., receiver 103) in accordance with an embodiment of the invention. Step 501 corresponds to the power up the transmitter-receiver pair (e.g., transmitter 101 and receiver 103). In step 503, the paired receiver initializes itself. For example, the paired receiver clears the stored identification number associated with the previous power up cycle. In step 505, the paired receiver expects that a new identification number will be received in a predetermined time interval (e.g., 5 seconds). If the paired receiver does not receive the identification number at least one time, the paired receiver generates a warning signal (e.g., a blinking LED to the user). If the paired receiver receives the identification number at least one time, as determined by step 509, the paired receiver stores the received identification number in step 511. The stored identification number is used for processing subsequent command messages.

In step 513, the paired receiver determines whether a command message has been received. If so, the paired receiver in step 515 determines whether the received identification number matches the stored identification number. If the received identification number matches the stored identification number, the corresponding command is executed by the paired receiver in step 517. If the received identification number does not match the stored identification number, the paired receiver ignores the command message and step 513 is repeated, where the paired receiver waits to receive the subsequent command message.

In an embodiment of the invention, transmitter 200 sends periodic messages ("heartbeat" messages) to the paired receiver even if no corresponding action is to be taken by the paired receiver. If no action is to be taken, the action corresponds to a "NOP" (no operation). However, periodic messages insure that the communication path between transmitter 200 and the paired receiver is reliable. If paired receiver does not receive periodic messages, the paired receiver may activate a communications warning indicator to indicate faulty communications between transmitter 200 and the paired receiver.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transmitter that communicates with a receiver over a wireless communications channel, the transmitter comprising:
   a memory;
   a detector detecting an occurrence when a signal event occurs for a signal;
   a counting module incrementing a count value for each incremental time interval; and
   a processor coupled to the memory and performing based on instructions stored in the memory:
   determining, from the count value obtained from the counting module, a first count indicative of a time interval between a power up of the transmitter and a first occurrence of the signal event, wherein the first occurrence is detected by the detector after the power up;
   determining a second count from a time duration spanning a number of subsequent occurrences of the signal event equal to the first count;
   determining an identification number from the second count; and
   associating the identification number with a message to the receiver.

2. The transmitter of claim 1, wherein the signal comprises an alternating current (AC) signal, further comprising:
   a power module that converts power from the AC signal to power the transmitter.

3. The transmitter of claim 1, further comprising:
   a communications module that transmits the message to the receiver over the wireless communications channel.

4. The transmitter of claim 1, wherein the signal comprises an alternating current (AC) signal and wherein the detector determines when the AC signal passes through a zero value.

5. The transmitter of claim 4, wherein the processor obtains the second count that corresponds to the AC signal passing through the zero value for a selected number of times.

6. The transmitter of claim 1, wherein the processor initiates transmission of the identification number over the wireless communications channel to the receiver during a predetermined time period when the processor powers up.

7. A system that provides communication for a plurality of transmitters and a plurality of receivers, the system comprising:
   a transmitter having a first memory and a first processor, the first processor coupled to the first memory and performing based instructions stored in the first memory:
   associating with a receiver that is powered by a same power module from an alternating current (AC) signal;
   determining a first count from a first occurrence of a signal event when the AC signal passes through a reference value after a power up of the transmitter by the same power module;
   generating an identification number from a second count based on a time duration spanning a number of subsequent occurrences of the signal event equal to the first count;
   sending the generated identification number to a receiver over a wireless communications channel during a predetermined time period when the transmitter powers up; and
   sending a message to the receiver wherein the message is associated with the generated identification number; and
   the receiver having a second memory and a second processor, the second processor coupled to the second memory and performing based on instructions stored in the second memory;
   receiving the generated identification number from the transmitter during the predetermined time period;
   comparing a received identification number that is received in a received message; and
   processing the received message only if the received identification number matches the generated identification number.

8. The system of claim 7, wherein the receiver indicates if the generated identification number is not received during the predetermined time period.

9. A method for communicating between a transmitter and a receiver that are powered by a same power module from an alternating current (AC) signal, the method comprising:
- incrementing a count value when an incremental time interval has occurred;
- detecting an occurrence of a signal event when an alternating current (AC) signal passes through a reference value;
- in response to the detecting, determining, from the count value, a first count when a first occurrence of the signal event is detected after a power up by the same power module;
- generating an identification number from a second count based on a time duration spanning a number of subsequent occurrences of the signal event equal to the first count;
- sending the identification number to the receiver during a predetermined time duration; and
- sending a message to the receiver with the identification number on a wireless communications channel.

10. The method of claim 9, further comprising:
- receiving the identification number from the transmitter and storing the identification number as a stored identification number;
- receiving a received message with a received identification number; and
- processing the received message only if the received identification number matches the stored identification number.

11. The method of claim 9, wherein the wireless communications channel is selected from the group consisting of a radio frequency (RF) channel, an infra-red channel, and a visible light channel.

12. The method of claim 10, further comprising:
- if the identification number is not received in the predetermined time duration, providing a notification that the identification number was not received.

13. The method of claim 10, further comprising:
- discarding the received message if the received identification number does not equal the stored identification number.

14. The method of claim 9, further comprising:
- determining a number of zero crossings of the AC signal; and
- accumulating the count value during the number of zero crossings.

15. The method of claim 9, wherein the reference value has a zero value.

16. The method of claim 9, wherein sending the identification number comprises:
- sending the identification number a predetermined number of times.

17. The method of claim 9, wherein the second count corresponds to an $n^{th}$ zero-crossing of the AC signal.

18. The method of claim 9, wherein the identification number is included in a header of the message.

19. The method of claim 9, further comprising:
- sending periodic message to the receiver with the identification number on the wireless channel, the periodic message being transmitted every time period.

20. The method of claim 19, further comprising:
- if the receiver does not receive the periodic message, providing an indication.

* * * * *